UNITED STATES PATENT OFFICE.

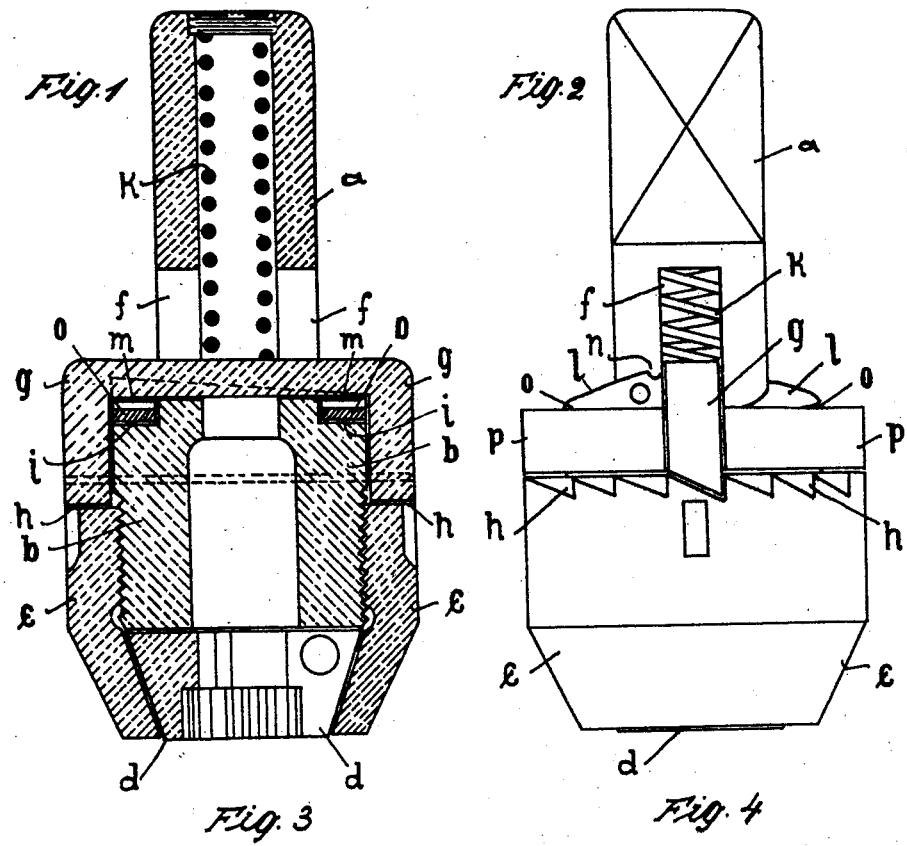

JOSEF SCHWAHLEN, OF SOLINGEN, GERMANY.

CHUCK.

1,410,080.  Specification of Letters Patent.  Patented Mar. 21, 1922.

Application filed December 1, 1921. Serial No. 519,275.

*To all whom it may concern:*

Be it known that I, JOSEF SCHWAHLEN, a citizen of the German Republic, and residing at Solingen, Germany, have invented certain new and useful Improvements in Chucks, (for which I have filed application in Germany, Nov. 29, 1920,) of which the following is a specification.

Heretofore, chucks are known for the operation of boiler stay-bolts and the like, in which a screw serves for closing the clamping-jaws, said screw being locked by means of a spring-pressed stirrup guided on the shaft of the tool and engaging in ratchets of the nut belonging to said screw and in which said clamping-jaws are located.

The present invention consists in arranging on the shaft of said screw and beneath the spring-pressed stirrup engaging in the ratchets of said nut, a turnable ring with helically inclined planes, for the purpose of lifting the stirrup from said ratchets by means of said inclined planes when the ring is correspondingly turned and of fixing the stirrup in the disengaged position, so that the screw can be screwed out of the nut and the chuck can be opened.

In the accompanying drawing, the improved chuck is represented: Fig. 1 is a central longitudinal section, Fig. 2 is an elevation, Fig. 3 is an underside plan view, and Fig. 4 is a plan view, of the same.

The cornered shaft $a$ is provided with a screw $b$, on which the nut $c$ is screwed. At its front end, the nut $c$ is conically bored-out and there serves for the reception of clamping-jaws $d$, which are pressed asunder and against the walls of the nut $c$ by means of springs $e$. Upon the screw $b$ being screwed toward the clamping-jaws $d$, the latter are adjusted in the nut $c$ to the front end of the same, whereby the clamping-jaws $d$ are closed and the chuck is clamped fast on the work-piece.

In a slot $f$ of the shaft $a$, a stirrup $g$ is guided, which, through recesses $r$ of a collar $p$ of the screw $b$, engages in ratchets $h$ of the nut and thereby prevents the screw $b$, when turning the chuck backwards, from being screwed out of the nut whereby the chuck would be opened and disengaged from the work-piece. In the hollow shaft $a$ of the screw $b$, a spring $k$ is arranged, which acts upon the stirrup $g$ and thereby keeps the same in springy contact with the ratchets $h$ of the nut $c$. The screw $b$ can thus be freely screwed in the nut $c$, owing to the springy arrangement of the stirrup $g$.

Below the stirrup $g$ and in a depression $i$ of the screw $b$, a turnable ring $o$ is mounted, which is provided with two helically inclined planes $l$. Upon the ring $o$ being so adjusted that the highest points of the planes $l$ are located beneath the stirrup $g$, the latter is disengaged from the ratchets $h$ of the nut and the screw $b$ can be screwed out of the nut $c$, the chuck being thus opened. In order to fix the ring $o$ in the position above-described, catches $m$ are arranged on the underside of the stirrup $g$, which engage in corresponding notches $n$ of the ring $o$ and which are held therein by the springy arrangement of the stirrup $g$.

For using the chuck, a hand-lever is set upon the shaft $a$ of the screw $b$ and the chuck is turned by the same in one or the other direction, according to whether the work-piece is to be tightened or loosened. To prevent the clamping-jaws $d$ slipping on the work-piece, their gripping surfaces are toothed.

What I claim, is:

In a chuck, the combination with a nut having ratchets therein, clamping-jaws in the front end of said nut, a screw engaging in said nut and adapted to close said clamping-jaws, an operating shaft on said screw, and an axially guided spring-pressed stirrup engaging in the ratchets of said nut and adapted to lock said clamping-jaws in closed positions, of a turnable ring having notches therein and arranged on said shaft and beneath said spring-pressed stirrup, there being helically inclined planes on said ring adapted, when the ring is correspondingly turned, to lift said stirrup and to disengage the same from the ratchets of said nut, and catches on said stirrup adapted to engage in the notches in said ring and thereby to fix the latter in its stirrup-engaging position, substantially as and for the purpose set forth.

In testimony whereof I have hereunto set my hand in the presence of two subscribing witnesses.

JOSEF SCHWAHLEN.

Witnesses:
 MAX NOLDEN,
 TRUDE EUKE.